United States Patent
Shea et al.

Patent Number: 6,064,881
Date of Patent: May 16, 2000

[54] SYSTEM AND METHOD FOR PROCESSING SATELLITE BASED TELEPHONE USAGE DATA FOR BILLING SERVICE PROVIDERS

[75] Inventors: Patrick D. Shea; William G. Good, both of Torrance, Calif.

[73] Assignee: TRW Inc., Redondo Beach, Calif.

[21] Appl. No.: 08/995,331

[22] Filed: Dec. 22, 1997

[51] Int. Cl.[7] .................................................. H04Q 7/20
[52] U.S. Cl. .......................... 455/427; 455/406; 455/12.1
[58] Field of Search ................................. 455/406, 427, 455/12.1; 379/113, 114, 133, 134; 370/316, 321; 342/457, 387

[56] References Cited

U.S. PATENT DOCUMENTS

| | | | |
|---|---|---|---|
| 5,291,543 | 3/1994 | Freese et al. | 455/408 |
| 5,327,144 | 7/1994 | Stilp et al. | 342/457 |
| 5,708,963 | 1/1998 | Mobley et al. | 455/12.1 |
| 5,802,455 | 9/1998 | Wiedeman et al. | 455/12.1 |
| 5,826,195 | 10/1998 | Westerlage et al. | 455/456 |
| 5,832,379 | 11/1998 | Malinckrodt | 455/427 |
| 5,835,061 | 11/1998 | Stewart | 342/457 |
| 5,884,157 | 3/1999 | Karmi | 455/406 |
| 5,903,830 | 5/1999 | Joao et al. | 455/406 |
| 5,907,541 | 5/1999 | Fairholm et al. | 455/427 |
| 5,913,164 | 3/1999 | Pawa et al. | 455/406 |

*Primary Examiner*—Dwayne D. Bost
*Assistant Examiner*—Jean A. Gelin
*Attorney, Agent, or Firm*—Michael S. Yatsko

[57] ABSTRACT

A technique for gathering, correlating, sorting and distributing usage data records in a satellite based telecommunications system having multiple orbiting satellites (10, 12), multiple earth stations (16, 18) and multiple gateways (29, 42) for connecting with conventional public switched telephone networks (28, 30). Calls originated by or destined to a satellite user terminal (20, 24) trigger the generation of usage data records of various types to record the times of usage and other data, for each call, pertaining to various system resources, such as the earth stations, satellites, and radio connections between them. The data records for each call are correlated (58) and linked together to define a service usage record for the call. The service usage records are periodically pooled (60) and sorted (62) by subscriber service provider at a central site (36) and then distributed (66) to service providers for billing purposes. Use of a subscriber telephone number that includes a service provider identification field facilitates sorting of the service usage records by service provider, and providing a mobile satellite service identification field in the telephone number facilitates identification of data records pertaining to calls to or from subscribers to the service.

16 Claims, 7 Drawing Sheets

* PSTN: PUBLIC SWITCHED TELEPHONE NETWORK

| COUNTRY CODE | NATIONAL DESTINATION CODE | SUBSCRIBER NUMBER |
|---|---|---|
| 1　2　3 | 4　5　6　7　8 | 9　10　11　12　13　14　15 |
| MOBILE SATELLITE SERVICE | HOME LOCATION REGISTER | SUBSCRIBER RECORD |

FIG. 8

SYSTEM AND METHOD FOR PROCESSING SATELLITE BASED TELEPHONE USAGE DATA FOR BILLING SERVICE PROVIDERS

BACKGROUND OF THE INVENTION

This invention relates generally to cellular telecommunication systems and, more particularly, to systems for generating statistical usage and billing information in cellular telecommunication networks that employ earth-orbiting satellites.

Satellite-based cellular telephone systems have been proposed in recent years, to provide worldwide telecommunication coverage. These systems are similar to terrestrial cellular telecommunication systems in that they have a grid of service zones or cells. They differ in that the satellite systems use a constellation of satellites with communication transponders instead of fixed radio towers as in terrestrial cellular systems. In a satellite-based cellular system, a user located in one of the cells communicates with the system through the satellite transponder covering a service zone in which the user is located. The satellite then communicates either with another satellite or with an earth station, to forward the call to a receiving party, who may be another satellite cellular user or a user connected through a conventional public switched telephone network (PSTN). Since a satellite-based cellular system provides worldwide communications, its users may be interconnected through an extensive and changing set of network elements. A users call could start through one satellite and an associated earth station, and be handed over to one or more other satellites and earth stations during the course of the call. Also, many of the calls use not only the resources of the satellite system, but the resources of other telephone communication providers as well.

Keeping track of how all the system resources are allocated and used in each call is necessary for billing purposes and for other reasons, such as statistics gathering for use in system design and expansion, traffic analysis and reporting, or detection and prevention of fraud. The present invention is concerned with generating system usage data for billing purposes. Gathering usage data in a conventional terrestrial cellular telephone system makes use of a call data record (CDR) that is generated for each call initiated by a user of the system. So long as the user remains in the service area of his cellular service provider, generating the billing data is a relatively simple process because the user is typically billed at a flat per-minute rate for use of the cellular system. If the user connects with a conventional telephone in a public switched telephone network (PSTN), additional charges may be incurred, including long-distance charges, depending on the location of the called telephone. If the cellular user is outside his normal service area, additional charges are usually involved, for "roaming" into another service area, but the billing statistics are still relatively simple to gather, sort and distribute.

In a satellite-based telecommunications system, a single call may use resources of multiple satellites, earth stations, radio-frequency communication links, public switched telephone networks and other network elements. Moreover, the times that these resources are used and the billing rates that apply to them may not be readily available at the time the call is made, and resources used may change during the call. A further difficulty is that, even if resource usage information is transmitted to a central site as soon as it becomes available, the information will not necessarily arrive at the same time. Consequently, gathering and sorting resource usage data becomes an extremely difficult task when a cellular system includes multiple communication satellites and associated resources scattered around the world. Another billing difficulty arises because users will typically purchase access to the system from a service provider in a particular country, but may operate a user terminal in practically any country. From the user's standpoint, connection from the user terminal to any telephone in the world must be automatic and "seamless." Yet the resource usage records must be automatically associated with every call, attributed to the user who made the call, and distributed automatically to the user's service provider for billing. It will be apparent that there is a need for a telecommunication billing system that meets all these requirements. The present invention satisfies this need.

SUMMARY OF THE INVENTION

The present invention resides in a method and system for gathering, sorting and distributing resource usage data in a satellite-based telecommunications system. Briefly, and in general terms, the method of the invention comprises the steps of generating, in various satellite telecommunications network components, data records pertaining to use of system resources by telephone calls; merging and correlating the data records for each telephone call, to generate a service usage record that links all of the data records pertaining to the call; sorting the service usage records by service provider; and distributing, to each service provider, service usage records for all calls made by subscribers receiving service from that service provider.

More specifically, the merging and correlating steps include merging and correlating data records in at least one earth station processor that participates in a telephone call; storing the merged and correlated data records at each earth station processor; transmitting any stored data records periodically from each earth station to a central site processor; and merging and correlating periodically, in the central site processor, the data records transmitted from the earth stations. The step of merging and correlating periodically includes sorting the data records in time sequence; identifying a key record for each call; identifying other, non-key records that correlate with each key record; and linking the correlated key and non-key records to form an aggregated service usage record for each call. Merging and correlating may further include discarding any non-key records that cannot be correlated with any key record; and identifying any incomplete service usage records and saving them for further processing in a subsequent processing cycle.

The step of generating data records may include generating a record of radio connection between an earth station and an orbiting satellite; and generating a record defining a satellite subscribers geographical location when initiating a telephone call. In accordance with an important aspect of the invention, each satellite subscriber telephone number includes a field containing a home location code that identifies the subscriber's service provider. Each data record generated includes identification of a called number and a calling number. Therefore, the step of sorting service usage records by service provider can be effected by sorting the records using the home location in the calling or called number as a sort key.

The step of generating data records may also include generating data records corresponding to usage of components administered by various telecommunications network operators other than the satellite telecommunications network, and may also include generating a call data record in a telephone switch upon initiation of a call.

Another aspect of the invention may be defined in terms of a method for identifying telephone subscribers in a satellite based telecommunications system. This method comprises the steps of using a first field of a subscriber telephone number to identify a mobile satellite service that maintains the telecommunications system; using a second field of the subscriber telephone number to identify a service provider with whom the subscriber contracts to provide telecommunications service through the identified mobile satellite service; and using a third field of the subscriber telephone number to identify the subscriber. Ideally the total length of the telephone number is not more than fifteen digits, consistent with a conventional international telephone number in a terrestrial telecommunications system. The use of a service provider code in the subscriber telephone number facilitates sorting of the service usage records by service provider, and the use of a mobile satellite service code in the subscriber telephone number facilitate identification subscriber charges in call data records originating in other telecommunications networks.

The invention may also be defined in terms of a system for processing satellite based telephone usage data for service providers, the system comprising means for generating, in various satellite telecommunications network components, data records pertaining to use of system resources by telephone calls; means for merging and correlating the data records for each telephone call, to generate a service usage record that links all of the data records pertaining to the call; means for sorting the service usage records by service provider; and means for distributing, to each service provider, service usage records for all calls made by subscribers receiving service from that service provider. More specifically, the means for merging and correlating includes means for merging and correlating data records in at least one earth station processor that participates in a telephone call; means for storing the merged and correlated data records at each earth station processor, means for transmitting any stored data records periodically from each earth station to a central site processor; and means for merging and correlating periodically, in the central site processor, the data records transmitted from the earth stations. Further, the means for merging and correlating periodically includes means for sorting the data records in time sequence; means for identifying a key record for each call, wherein the key record identifies the call; means for identifying other records that correlate with each key record; and means for linking the correlated key and non-key records to form an aggregated service usage record for each call.

The invention may also be defined as a data field structure for a subscriber telephone number, for use in a satellite based telecommunications system. The data field structure comprises a first data field identifying a mobile satellite service that maintains the telecommunications system; a second data field identifying a service provider with whom the subscriber contracts to provide telecommunications service through the identified mobile satellite service; and a third data field identifying the subscriber. Use of the data field structure in service usage records facilitates sorting of the service usage records by service provider, and identification of service usage records that pertain to a telecommunications system maintained by a particular mobile satellite service.

It will be appreciated from the foregoing that the present invention represents a significant advance in the field of satellite based telecommunications systems. In particular, the invention provides a technique for gathering resource usage data records and systematically merging and correlating them to provide a service usage record pertaining to each call made in the system. Moreover, use of a service provider code in each subscriber telephone number facilitates sorting the service usage records by service provider, for convenience in reporting and billing. Other aspects and advantages of the invention will become apparent from the following more detailed description, taken in conjunction with the accompanying drawings.

BRIEF DESCRIPTION OF THE DRAWINGS

FIG. 8 is a diagram showing the assignment of data fields in a subscriber number, using the same number of digits as in a standard international telephone number.

DESCRIPTION OF THE PREFERRED EMBODIMENT

Figure 1:
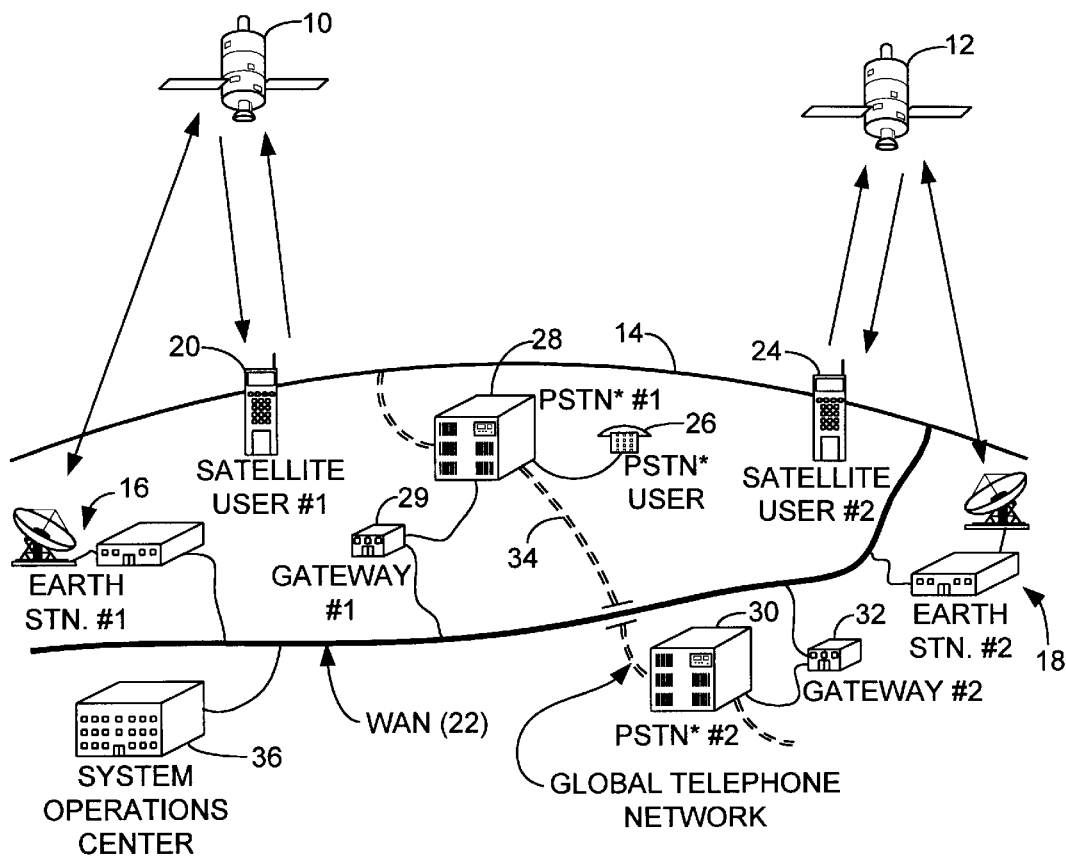
FIG. 1 is a diagrammatic view, not to scale, showing the principal components of a satellite-based telecommunications system in which the present invention is used.

Overview:

As shown in the drawings for purposes of illustration, the present invention pertains to a satellite-based telecommunications system, and to techniques for gathering, correlating, sorting and distributing resource usage data in such a system. FIG. 1 shows, by way of example, the principal components in a satellite-based telecommunications system. Such a system includes multiple orbiting satellites, two of which are shown as indicated by reference numerals 10 and 12. The satellites 10 and 12 are two of a constellation of similar satellites orbiting the earth 14 in various orbits to provide continuous coverage of almost the entire surface of the earth, or at least of the major land masses of the earth. Each region of the earth's surface covered by a satellite 10 or 12 has at least one associated earth station, indicated at 16 and 18. A region is said to be "covered by" a satellite when the satellite has the capability to transmit signals to and receive signals from the region. Typically, multiple satellites are needed to cover an entire continent. The satellites may be in geosynchronous earth orbit (GEO) in which they remain virtually stationary with respect to the earth's surface, or in lower altitude orbits in which they move relative to the earth's surface and a single call may have to be handled by multiple satellites.

A satellite user 20, indicated as user #1, may initiate a telephone call thereby establish communication with a satellite 10. The call is then relayed back to the ground, such as to earth station 16, indicated as earth station #1. The earth station 16 is connected to a wide area network (WAN) 22 and the user's call may next be transmitted over the WAN to another earth station 18, indicated as earth station #2, from which communication is established with the other illustrated satellite 12 and thence to another satellite user 24. Alternatively, if the call destination is a conventional telephone 26 connected to a public switched telephone network (PSTN) 28, the call may be transmitted to the destination telephone 26 through a gateway 29 that links the WAN 22 with the PSTN 28. For completeness, FIG. 1 also shows a second PSTN 30 connected to the WAN 22 through a separate gateway 32. The PSTNs 28 and 30 are interconnected by a global telephone network 34. As also shown in FIG. 1, the satellite-based telecommunications system further includes a systems operations center 36 connected to the WAN 22. The system operations center 36 performs various functions related to the maintenance of the entire satellite-based system and, as described further below, coordinates the gathering, correlation, sorting and distribution of data pertaining to system resource usage.

Figure 2:
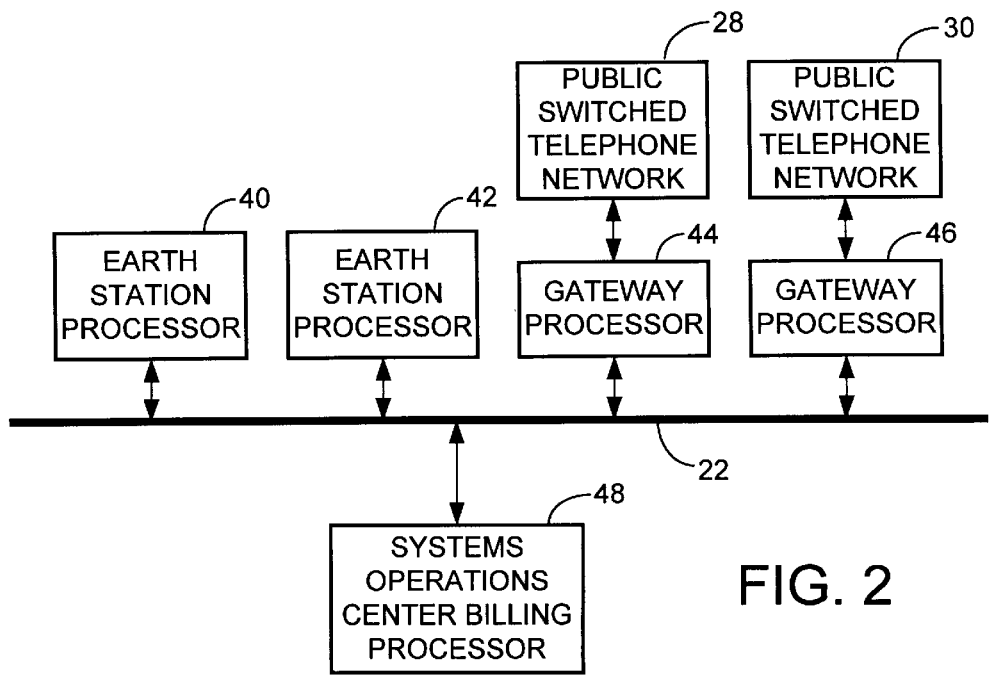
FIG. 2 is a block diagram showing the principal processors used to gather, correlate, sort and distribute resource usage data in the telecommunications system of FIG. 1, in accordance with the present invention.

The data gathering functions performed in accordance with the present invention use various processors located in the earth stations (such as 16 and 18), in the gateways (such as 29 and 32) and the systems operations center 36. FIG. 2 shows two earth station processors 40 and 42, two gateway processors 44 and 46, and a system operations center billing processor 48, all coupled to the WAN 22. As will be further discussed below, resource data in the form of call data records (CDRs) and service usage records (SURs) are processed at two basic levels: first in the earth station processors 40, 42 and the gateway processors 44 and 46, and then in the systems operations center billing processor 48, which performs final merging, correlation, sorting, and distribution functions.

Figure 3:
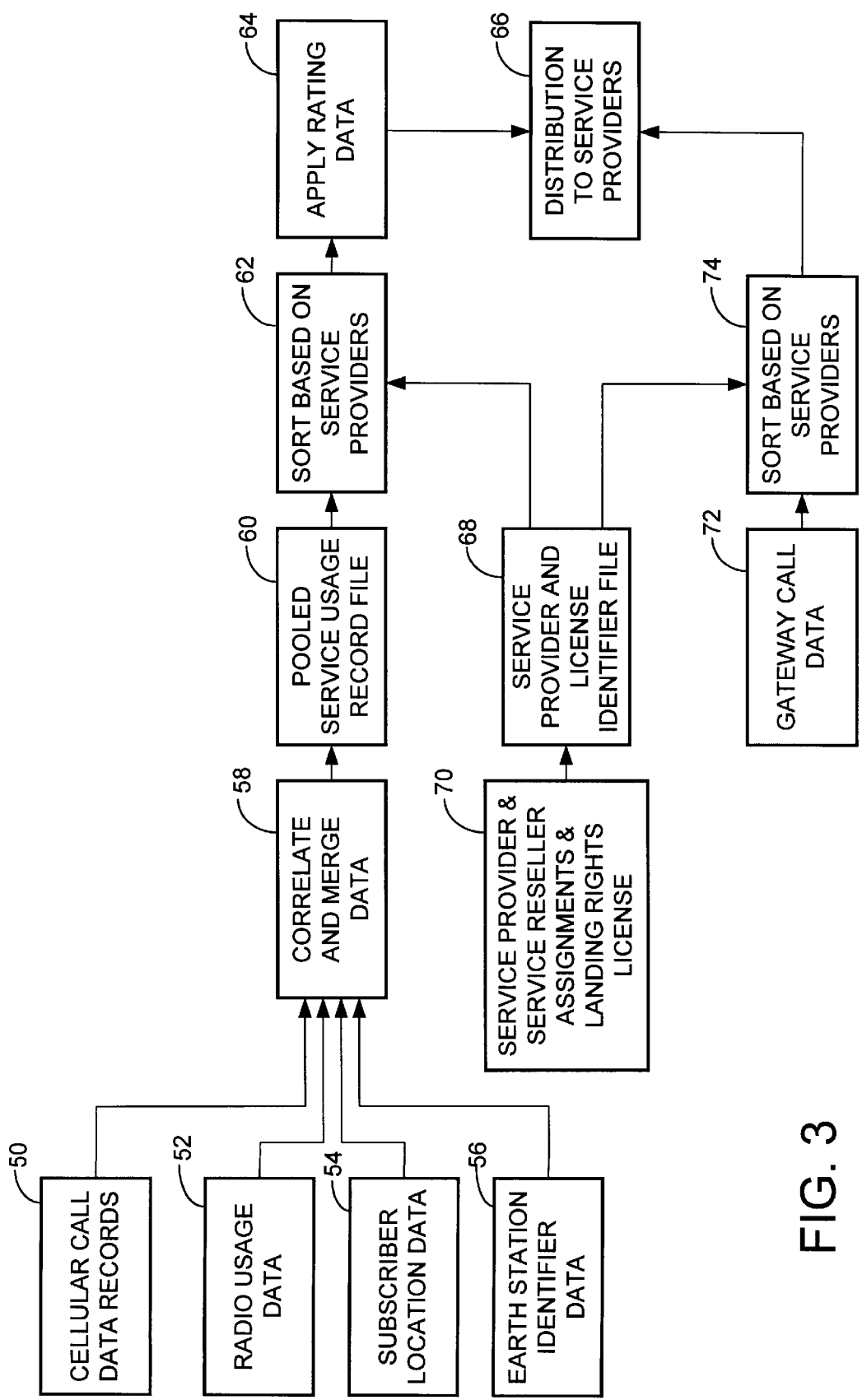
FIG. 3 is a block diagram showing the principle functions performed by the system of the present invention.

The block diagram of FIG. 3 depicts the basic flow of data in accordance with the invention. There are four principal sources or types of resource usage data, indicated by the four blocks 50, 52, 54 and 56 on the left-hand side of the figure. First there are conventional cellular call data records 50 that define the resources used in a terrestrial cellular telephone call. The remaining three sources of data pertain to satellite-based systems only. Radio usage data records 52 define which resources are used by a call in communicating between satellites and earth stations. Radio usage data 52, in the form of baseband usage records (BURs), are generated in each earth station when a call is initiated by a satellite user, and are augmented as the call progresses. Subscriber location data 54, in the form of location records, are also generated in an earth station and are used to record the location of the satellite user initiating the call. The earth station identifier data 56 identifies which earth station is participating in a call.

A critical function of the invention is to correlate and merge data from these four sources, as indicated in block 58, and to create a pooled service usage record file 60. This file is sorted based on service provider and service reseller information, as indicated in block 62. That is to say, the service usage records are sorted by service provider, since each service provider will be responsible for billing its own users. Then current rating data are applied to the service usage records, to convert the usage records to cost records, as indicated in block 64. Finally, the billing data are distributed to the various service providers, as indicated in block 66.

Sorting the usage records based on service providers requires the use of a service provider and license identifier file 68, which is continually updated, as indicated in block 70, with current information pertaining to the assignment of user accounts to service providers, or service resellers, who are simply another level of providers. Although arrangements with service providers and resellers may vary from one satellite-based system to another, typically a service provider will contract for a "landing rights" license effective in a specific geographical area, such as a country or state. Subscribers in a given region may have the option of receiving service from any of a choice of service providers. Even in this situation, each subscriber using a satellite terminal, i.e., a portable telephone, will be billed from a single service provider.

Another source of data for service usage records is gateway call data, indicated in block 72. A satellite user call may utilize resources of multiple communication networks. Provision must be made to inform each independent service provider of costs incurred on other networks beyond the providers control. Data records for this purpose are generated in equipment such as a gateway processor. The billing system of the present invention serves as a collection and distribution facility to route these data records between service providers. Thus, gateway call data 72 are also sorted by service provider, as indicated in block 74, and distributed to the appropriate service providers, as indicated in block 66.

Record Formats:

For a better understanding of the functions performed in the step of correlating and merging data records (block 58), it is important to identify the data fields included in each of the input file records. The specific record formats, including the number of data bits allocated to each field, are not important from the standpoint of the invention. The following lists identify the data fields included in each of the input files.

Call Data Record (CDR):
- Record header—contains information such as type of call, type of CDR.
- Study indicator—nature of call (real or test).
- Call forward indicator—whether the call is forwarded.
- Calling party.
- Calling number.
- Called number—dialed digits+numbering plan identifier that defines the numbering system used in the dialed digits.
- Calling equipment—equipment type.
- Event code.
- Channel allocation time.
- Answer time.
- Disconnect time.
- Release time.
- Off air call setup—whether call setup was accomplished off air.
- Half rate in use—whether lower quality radio channel used (at lower cost).
- Cause for termination.
- Call reference—number allocated to help correlate call records.
- Classmark—identifies the mobile terminal and its capabilities.
- Classmark time stamp.
- Dialed digits—number dialed by the user.
- Outgoing trunk group—path from an originating telephone switch.

Outgoing trunk member—path from an originating telephone switch.

Outgoing route group.

Trunk seizure—time at which trunk is allocated to the call.

Calling subscriber category—one of five subscriber priorities.

Call indicator—may indicate "no charge" CDR if there are multiple CDRs.

Call duration.

Diagnostic—details reason for release of a connection.

MSC number—identifies the telephone switch that produces the CDR.

Record number—an integer assigned to the record for auditing purposes.

Baseband Usage Record:

Record header.

Study indicator.

Calling party.

Calling number.

Called number.

Baseband id.

Feeder link id.

User link id.

Connect time.

Disconnect time.

Cause for termination.

Location Record:

Record header.

Calling party.

Calling number.

Called number.

Baseband id.

Call setup time.

Location identifier—uniquely identifies the subscriber location.

Quality factor—indicates the predicted accuracy of the user location.

Satellite id.

Record key—a unique number assigned to the record on its creation.

Earth Station Identifier:

Record header.

Earth station id.

Feeder link id.

Start time.

End time.

The call data record (CDR) format is consistent with a standard for terrestrial cellular telephone equipment, known as GSM (global system for mobile communication). The GSM standard was started in Europe but has now been adopted in other countries as well. A CDR is generated in a telephone switch for any call event that does not involve a satellite. The baseband usage record (BUR), location record (LR) and earth station identifier (ESI) are extensions beyond the GSM standard, needed to account for satellite-related resource usage in any call. In addition, the present invention introduces the concept of a service usage record (SUR), which is generated upon the origination or termination of a call involving a satellite user terminal. The SUR is an aggregation of data generated by multiple network elements and consolidated by the system of the invention. Thus the SUR does not have a specific record format, since it is simply a linked aggregation of data records pertaining to the same call. In this regard, it will be helpful to review the functions performed in an earth station when a call is initiated.

Earth Station Processing:

When a call is initiated from a PSTN telephone, the telephone switch that is part of the PSTN creates a CDR defining the call. If the call is destined for a satellite user, it is routed through an earth station, which, as part of its processing, establishes other data records: the baseband usage record (BUR) and the location record (LR). The aggregation of these records for the same call together form a service usage record (SUR). When a call is initiated from a satellite user terminal, the associated earth station creates a CDR in its associated telephone switch subsystem and also creates a BUR and an LR. The collection of these records form an SUR for the call. At the receiving end of the call, additional data records may be created, and usage data accumulated at a different earth station or telephone switch. These records all form part of the SUR, and will be merged and correlated in the billing system.

Figure 4:
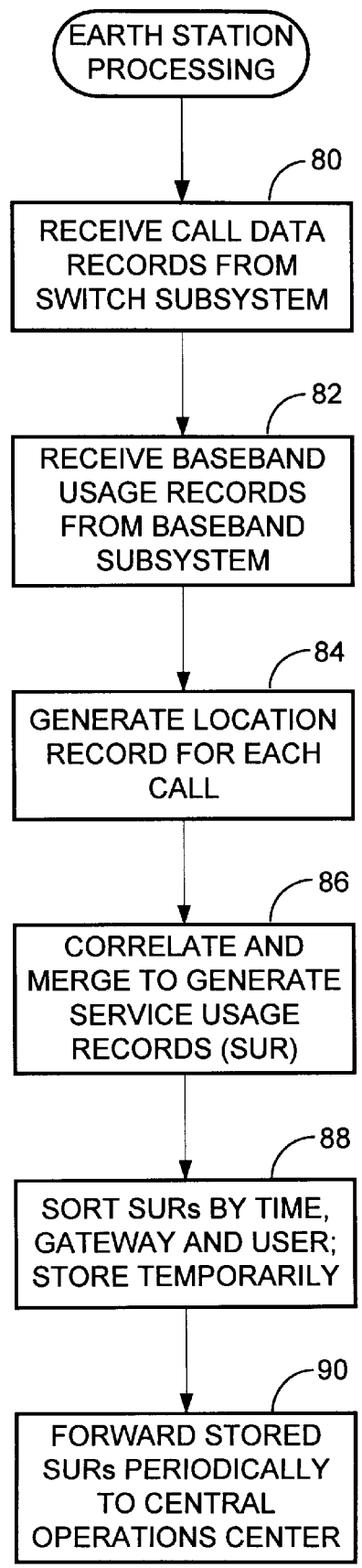
FIG. 4 is a flowchart showing functions performed in an earth station processor, in gathering, correlating and sorting resource usage data.

As shown in FIG. 4, earth station processing includes receiving call data records (CDRs) from a switch subsystem, as indicated in block 80, then receiving baseband usage records (BURs) from a baseband system of the earth station, as indicated in block 82. (Multiple records are referred to because the processing may be proceeding for multiple calls at approximately the same time.) For each call being originated through this earth station, the earth station processor also generates a location record for the originator of the call, as indicated in block 84. The aggregation of these records for a single call represents a service usage record (SUR). Earth station identifying data are also added to each SUR. A correlation and merging step, as indicated in block 86, generates the SURs. Correlation of the data records is accomplished by a combination of the calling number, the called number and a time associated with the call. Data records having a selected combination of these factors in common are designated as pertaining to the same call. The data records are said to be correlated, and are merged to create one logical SUR, or partial SUR, pertaining to that call. In the earth station processor, the SURs are sorted by time, gateway and user and are stored temporarily in a storage medium local to the earth station, as indicated in block 88. The stored SUR's are forwarded periodically to the central operations center billing processor 48, as indicated in block 90.

Figure 5:
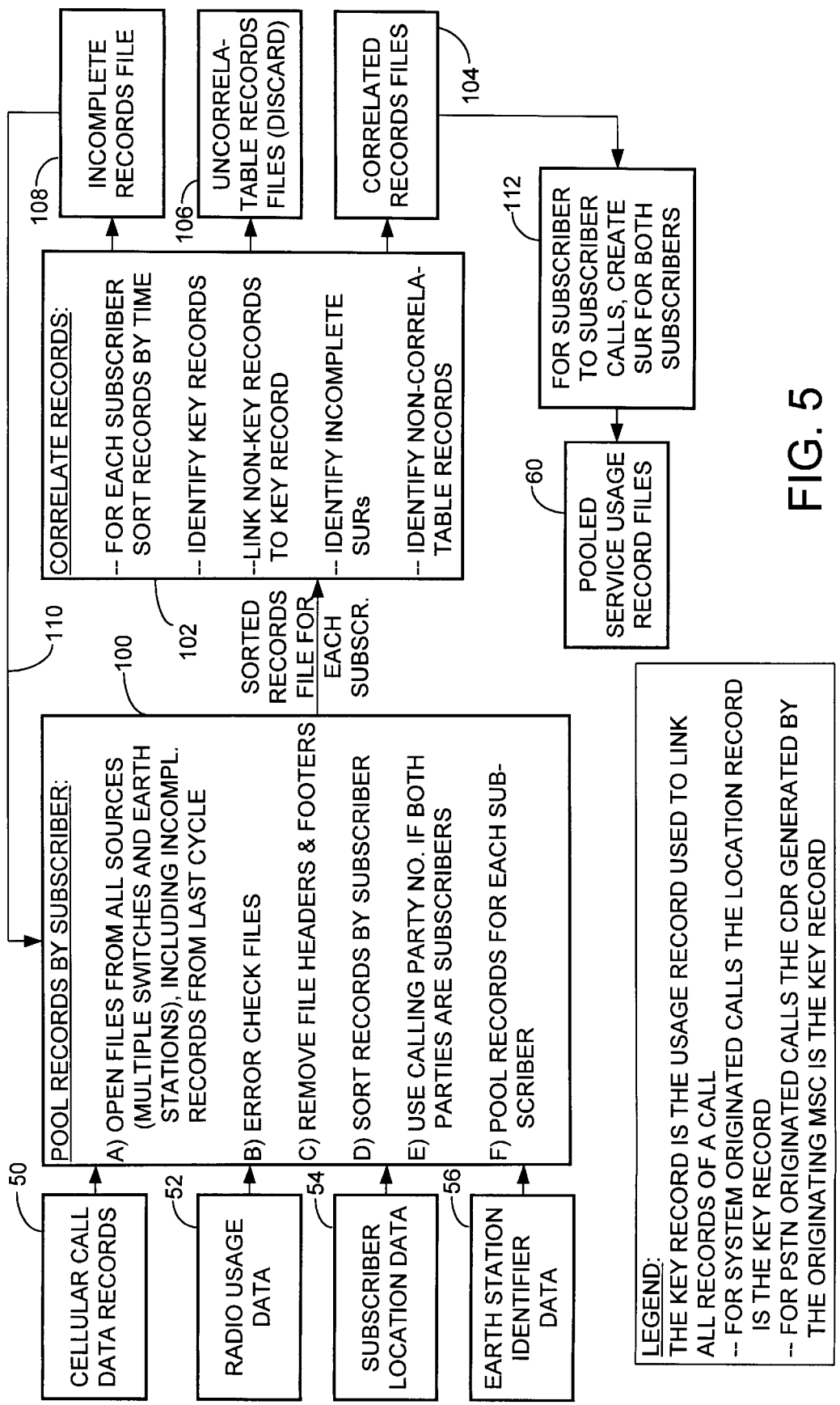
FIG. 5 is a flowchart showing functions performed in a system operations center billing processor, in merging and correlating resource usage data gathered from earth stations and other network components.

Central Site Processing:

FIG. 5 shows the functions performed by the system operations center billing processor 48, and in particular shows in expanded form the functions performed by the correlate and merge step 58. The first step in this process is pooling the data records by subscriber, as described in block 100. Within this block, six basic steps are described. In step A), files are opened from all sources, including multiple telephone switches and earth stations, and a file containing incomplete records from prior processing cycles. It will be understood at this point that each of the earth stations has accumulated SURs in local storage files and that a first level of correlation of usage records has already been accomplished in earth station processing, as described with reference to FIG. 4. Each earth station periodically transmits SUR files to the central site, where they are held for processing. The transfer of SUR files to the central site may occur, for example, on a fifteen-minute cycle, or more rapidly if a selected threshold number of records has accumulated for transfer. In step B), the SUR files are checked for errors and in step C) file headers and footers are removed prior to further processing. In steps D) through F), the SURs are sorted by subscriber identifier. It is noted in step E) that, if both the calling party and the called party are subscribers to the satellite system, the calling party's subscriber identifier is used to perform the sort. Step F) notes that the resulting records are pooled for each subscriber.

The next major step in the process is to correlate the sorted records obtained from processing block 100, as indicated in block 102. This is basically a process of linking records that pertain to the same call. First, for each subscriber the SURs are sorted by time, which inherently sorts them by call. Then key records are identified, based on a rule set forth in the legend accompanying the figure. A key record is defined as a usage record used to link all records of a single call. For system-originated calls, i.e., calls originating from a satellite user terminal, the key record is the location record generated when the call was initiated. For calls originating from a PSTN telephone, the key record is the call data record (CDR) generated by the originating telephone switch that first processed the call. Once the key records have been identified, one for each call, a linkage is created between each key record and other records (non-key records) that are correlated with the key record. Correlation is established by the identity of called and calling parties among the key and non-key records, or by selected other factors. The result of this process is a set of correlated records files 104.

In the course of the correlation process, some records may be identified as uncorrelatable with any key record. These records, indicated in block 106, are simply discarded because there is no way to relate them to any recorded call in the system. Finally, other linked sets of records, constituting SURs, may be recognized as incomplete because, for example, there is no indication of call completion an disconnection, or there is no completed baseband usage record, even though it is apparent that there was a satellite link. As mentioned earlier, the usage records are generated asynchronously, so it is always possible that some of the records needed to complete the SUR for call have not yet been received at the central site. These incomplete SURs are placed in an incomplete file 108, which is saved until the next processing cycle, and processed again, as indicated by the line 110 back to processing block 100. For example, a one-hour telephone call may take five fifteen-minute processing cycles to be fully reported.

A further processing step is needed for case of calls from one subscriber to another in the same satellite system. For such calls, it is assumed in the processing of block 100 that the calling party was the subscriber. After the correlated SUR files 104 have been generated, subscriber-to-subscriber calls are identified and a duplicate SUR is created for the called subscriber, as indicated in block 1 12. Consistent with terrestrial cellular billing practice, both the called and the calling subscribers are billed for resource usage. The result of correlation processing in FIG. 5 is the pooled service usage record files 60.

Figure 6:
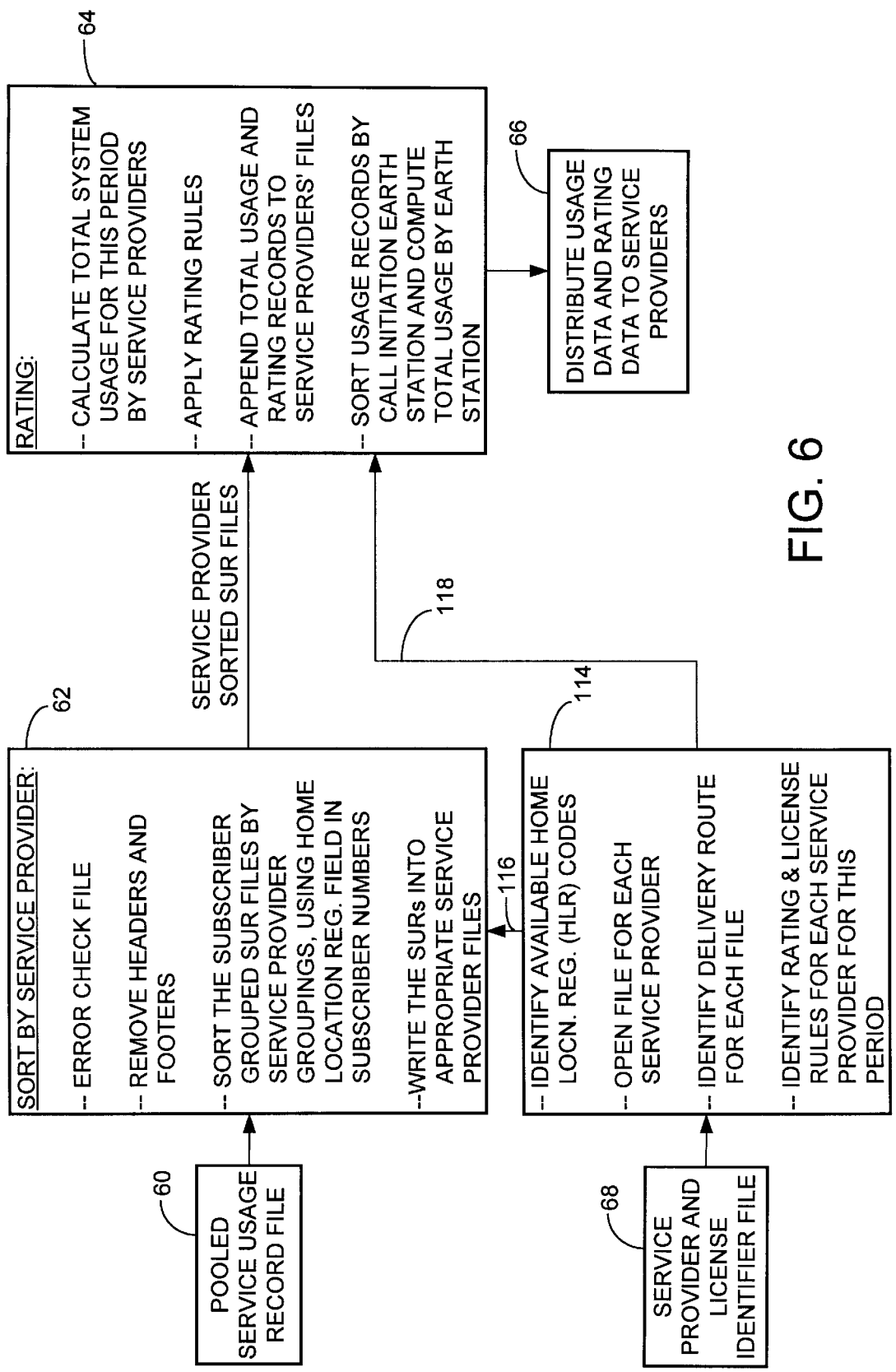
FIG. 6 is a flowchart showing functions performed in the system operations center billing processor, in sorting pooled resource usage data by service provider, and applying rating rules to the data for distribution to service providers.

The central processing steps of sorting and rating are further expanded in FIG. 6. The service provider and license identifier file 68 is subject to further processing as indicated in block 114. Each service provider is identified in terms of a home location register (HLR) code, which is a unique service provider identifier. Then a file is opened for each service provider. The HLR codes and opened file information are passed to the sorting process 62, as indicated by line 116. For each service provider, the processing in block 114 also identifies a delivery route for distribution of usage data, and retrieves rating and license rules for the provider. These items of information are passed to the rating process block 64, as indicated by line 118.

In the process of sorting by service provider, the pooled service usage record file 60 is first checked for errors and any headers and footers are removed. Then the sorting process is performed, using the HLR codes provided by processing block 114. SURs are sorted into the service provider files opened in block 114.

Sorting by service provider is facilitated by the format of each subscriber's telephone number, as shown in FIG. 8. By agreement, international telephone numbers are limited to a maximum of fifteen digits. For conventional terrestrial telephones, these digits are formatted as indicated at the top of the figure, with the first three digits being the country code, the next five digits being a national destination (area) code, and the last seven digits being the subscriber local number. In accordance with an important aspect of the present invention, satellite subscribers are also identified by a fifteen-digit number, but formatted as shown at the bottom of the figure. Since satellites provide coverage that often exceeds or overlaps national boundaries, the country code and national destination code have little significance. More important are the identification of the mobile satellite service that is providing service to the subscriber, and the identity of the service provider within the identified mobile satellite service. It is contemplated that there may be competing mobile satellite services, each with its own constellation of satellites, its own earth stations and its own gateways to terrestrial networks. In the format shown, four digits are reserved to identify the mobile satellite service and the next three digits are reserved to identify a service provider or service reseller. The latter field is referred to as the home location register (HLR) code. For any satellite subscriber initiating or receiving a call, the calling and called numbers will be recorded in this format. Therefore, sorting the SURs by service provider simply requires sorting on the HLR code field in the subscriber numbers identified in the SURs.

Applying the rating rules, as indicated in block 64 of FIG. 6, involves conversion of the SURs to corresponding costs, to be used for subscriber billing by the service providers. In addition, the central system also calculates total usage for this period by each service provider, and appends the total usage and rating records to the service providers' files generated in the sorting process 62. Finally, the usage records are sorted by initiation earth station, and the total usage by earth station is computed for the service providers convenience. The service providers' files generated in processing blocks 62 and 64 are then distributed, as indicated in block 66, using the delivery route information provided from block 114.

Figure 7:
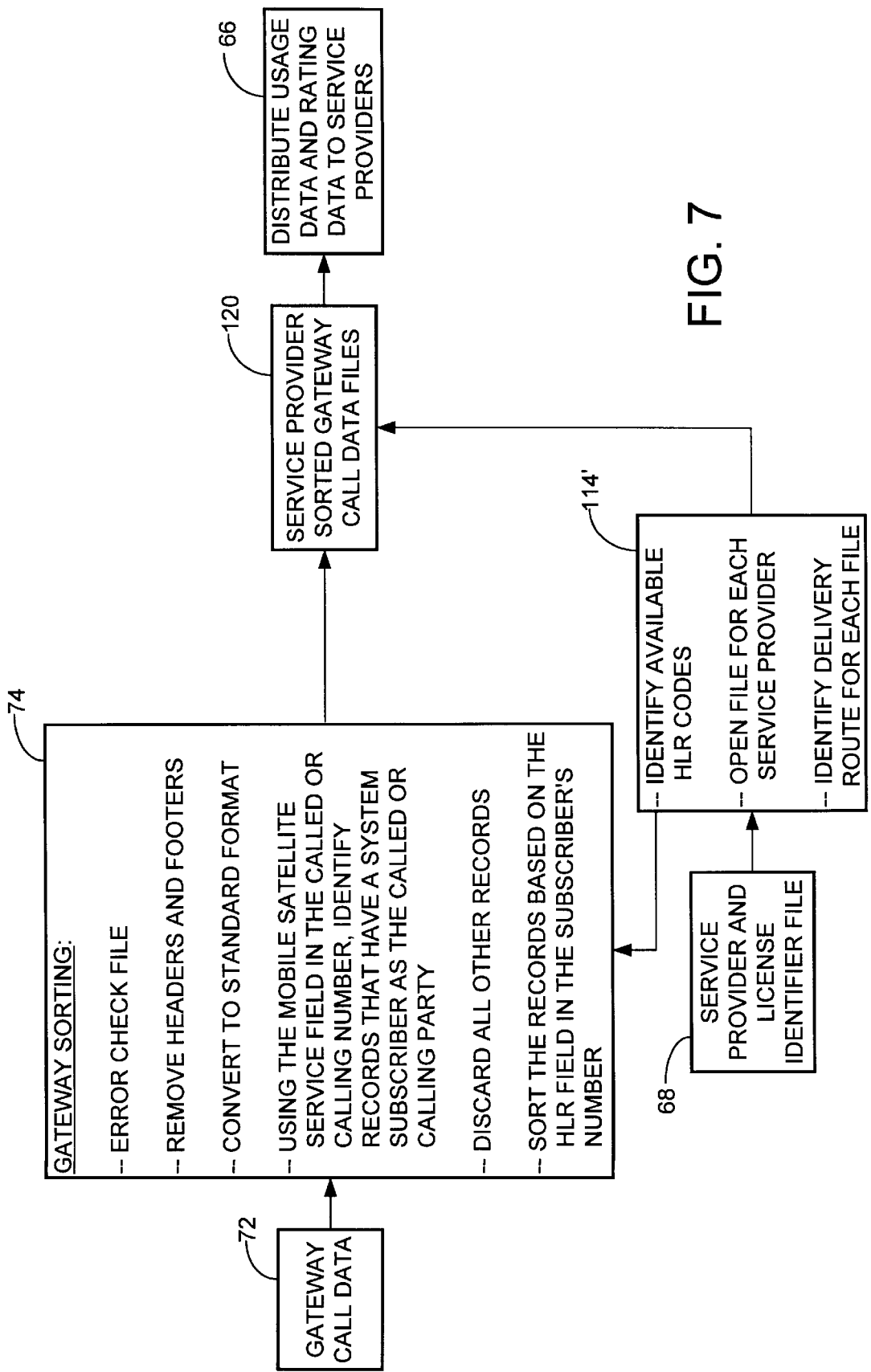
FIG. 7 is a flowchart showing functions performed in the system operations center billing processor, in processing gateway data pertaining to usage of resources outside of the satellite-based system.

FIG. 7 shows more detail of the steps performed in the processing of gateway data 72. Ancillary processing in block 114' is similar to the processing performed in block 114 (FIG. 6). The service provider and license identifier file 68 is processed to identify available HLR codes, to open a file for each service provider, and to identify a delivery route for each service provider file. Sorting of gateway data, in block 74, includes error checking the gateway data, removing any headers and footers, and converting the file to a standard format for further processing. Each record of gateway call data is examined to determine whether called or calling number has this system's mobile satellite service identifier (in the first four digits). This identifies the gateway data as pertaining to a call originating from or destined to a subscriber of this satellite system. All other gateway data records are discarded because they are not billable to a subscriber of the system. All retained records are then sorted by service provider, using the HLR code as a sort key, and are output as indicated in block 120. These sorted records are distributed to the service providers, as indicated in block 66, with the other usage data generated in the process described with reference to FIG. 6.

It will be appreciated from the foregoing that the present invention represents a significant advance in the field of satellite telecommunications systems. In particular, the invention provides a technique for gathering, sorting and distributing billing data records pertaining to usage of various system resources. The billing data records are conveniently sorted by subscriber service provider and distributed together with applicable rates, costs and usage summaries. It will also be appreciated that, although a specific embodiment of the invention has been described in detail for purposes of illustration, various modifications may be made without departing from the spirit and scope of the invention. Accordingly, the invention should not be limited except as by the appended claims.

What is claimed is:

1. A method for processing satellite based telephone usage data for service providers, the method comprising the steps of:

generating, in various satellite telecommunications network components, data records pertaining to use of system resources by telephone calls;

merging and correlating the data records for each telephone call, to generate a service usage record that links all of the data records pertaining to the call, each service usage record specifying a service provider for the call to which the service usage record pertains;

sorting the service usage records by service provider; and distributing, to each service provider, those of the service usage records that pertain to all calls made by subscribers receiving service from that service provider;

wherein the merging and correlating steps include merging and correlating data records in at least one earth station processor that participates in a telephone call, storing the merged and correlated data records at each earth station processor, transmitting any stored data records periodically from each earth station to a central site processor, and merging and correlating periodically, in the central site processor, the data records transmitted from the earth stations.

2. A method as defined in claim 1, wherein the step of merging and correlating periodically includes:

sorting the data records in time sequence;

identifying a key record for each call, wherein the key record identifies the call;

identifying other records that correlate with each key record; and linking the correlated key and non-key records to form an aggregated service usage record for each call.

3. A method as defined in claim 2, wherein the step of periodically merging and correlating further includes:

discarding any non-key records that cannot be correlated with any key record; and identifying any incomplete service usage records and saving them for further processing in a subsequent processing cycle.

4. A method as defined in claim 1, wherein the step of generating data records includes generating a record of radio connection between an earth station and an orbiting satellite.

5. A method as defined in claim 1, wherein the step of generating data records includes generating a record defining a satellite subscriber's geographical location when initiating a telephone call.

6. A method as defined in claim 1, wherein:

each satellite subscriber telephone number includes a field containing a home location code that identifies the subscriber's service provider;

each data record generated includes identification of a called number and a calling number; and the step of sorting service usage records by service provider is effected by sorting the records using the home location in the called and calling numbers as a sort key.

7. A method as defined in claim 1, wherein the step of generating data records includes generating data records corresponding to usage of components administered by various telecommunications network operators other than the satellite telecommunications network.

8. A method as defined in claim 1, wherein the step of generating data records includes generating a call data record in a telephone switch upon initiation of a call.

9. A system for processing satellite based telephone usage data for service providers, the system comprising:

means for generating, in various satellite telecommunications network components, data records pertaining to use of system resources by telephone calls;

means for merging and correlating the data records for each telephone call, to generate a service usage record that links all of the data records pertaining to the call, each service usage record specifying a service provider for the call to which the service usage record pertains;

means for sorting the service usage records by service provider; and means for distributing, to each service provider, those of the service usage records that pertain to all calls made by subscribers receiving service from that service provider;

wherein the means for merging and correlating includes means for merging and correlating data records in at least one earth station processor that participates in a telephone call, means for storing the merged and correlated data records at each earth station processor, means for transmitting any stored data records periodically from each earth station to a central site processor, and means for merging and correlating periodically, in the central site processor, the data records transmitted from the earth stations.

10. A system as defined in claim 9, wherein the means for merging and correlating periodically includes:

means for sorting the data records in time sequence;

means for identifying a key record for each call, wherein the key record identifies the call;

means for identifying other records that correlate with each key record; and means for linking the correlated key and non-key records to form an aggregated service usage record for each call.

11. A system as defined in claim 10, wherein the means for periodically merging and correlating further includes:

means for discarding any non-key records that cannot be correlated with any key record; and means for identifying any incomplete service usage records and saving them for further processing in a subsequent processing cycle.

12. A system as defined in claim 9, wherein the means for generating data records includes means for generating a record of radio connection between an earth station and an orbiting satellite.

13. A system as defined in claim 9, wherein the means for generating data records includes means for generating a record defining a satellite subscriber's geographical location when initiating a telephone call.

14. A system as defined in claim 9, wherein:

each satellite subscriber telephone number includes a field containing a home location code that identifies the subscriber's service provider;

each data record generated includes identification of a called number and a calling number; and the means for sorting service usage records by service provider uses the home location in the called and calling numbers as a sort key.

15. A system as defined in claim 9, wherein the means for generating data records includes means for generating data records corresponding to usage of components administered by various telecommunications network operators other than the satellite telecommunications network.

16. A system as defined in claim 9, wherein the means for generating data records includes means for generating a call data record in a telephone switch upon initiation of a call.

\* \* \* \* \*